(12) United States Patent
Osborne et al.

(10) Patent No.: US 10,018,069 B2
(45) Date of Patent: Jul. 10, 2018

(54) VANE ARM WITH INCLINED RETENTION SLOT

(71) Applicant: United Technologies Corporation, Hartford, CT (US)

(72) Inventors: Christopher Osborne, Middletown, CT (US); Adam Nicholas Hart, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 441 days.

(21) Appl. No.: 14/838,906

(22) Filed: Aug. 28, 2015

(65) Prior Publication Data

US 2016/0123177 A1 May 5, 2016

Related U.S. Application Data

(60) Provisional application No. 62/074,816, filed on Nov. 4, 2014.

(51) Int. Cl.
| | |
|---|---|
| *F01D 17/14* | (2006.01) |
| *F02C 3/04* | (2006.01) |
| *F01D 9/04* | (2006.01) |
| *F01D 25/28* | (2006.01) |
| *F01D 17/16* | (2006.01) |

(52) U.S. Cl.
CPC ............. *F01D 17/14* (2013.01); *F01D 9/041* (2013.01); *F01D 17/162* (2013.01); *F01D 25/28* (2013.01); *F02C 3/04* (2013.01); *F05D 2220/32* (2013.01); *F05D 2240/12* (2013.01); *F05D 2240/35* (2013.01); *F05D 2260/74* (2013.01); *F05D 2260/79* (2013.01)

(58) Field of Classification Search
CPC ........ F01D 17/14; F01D 17/162; F01D 9/041; F01D 9/042
USPC .................................................. 415/159–166
See application file for complete search history.

(56) References Cited

U.S. PATENT DOCUMENTS

| | | | |
|---|---|---|---|
| 4,979,874 A | 12/1990 | Myers | |
| 6,887,035 B2 * | 5/2005 | Bruce | F01D 17/162 415/160 |
| 7,344,355 B2 * | 3/2008 | Wilshaw | F01D 17/162 415/160 |
| 8,651,803 B2 * | 2/2014 | Jones | F01D 17/162 415/160 |
| 2016/0123177 A1 * | 5/2016 | Osborne | F01D 17/162 60/805 |
| 2017/0254342 A1 * | 9/2017 | Medina Cruz | F04D 29/563 |

FOREIGN PATENT DOCUMENTS

| | | |
|---|---|---|
| EP | 2299064 | 3/2011 |
| GB | 2412947 | 10/2005 |
| WO | 2014158455 | 10/2014 |

OTHER PUBLICATIONS

Extended European Search Report dated Mar. 8, 2016 in European Application No. 15183438.9.

* cited by examiner

*Primary Examiner* — Timothy L Maust
(74) *Attorney, Agent, or Firm* — Snell & Wilmer, L.L.P.

(57) ABSTRACT

The present disclosure includes vane assemblies having a vane lever arm with an inclined profile. The inclined profile may engage with a complementary end of a vane shaft to locate, retain, and prevent rotation of the vane shaft and vane.

15 Claims, 4 Drawing Sheets

VANE ARM WITH INCLINED RETENTION SLOT

CROSS-REFERENCE TO RELATED APPLICATIONS

This application is a nonprovisional of, and claims priority to, and the benefit of U.S. Provisional Application No. 62/074,816, entitled "VANE ARM WITH INCLINED RETENTION SLOT," filed on Nov. 4, 2014, which is hereby incorporated by reference in its entirety.

GOVERNMENT RIGHTS

The present disclosure was made with government support under Contract Number FA8650-09-D-2923-0021 awarded by the U.S. Air Force. The government has certain rights in the present disclosure.

FIELD

The present disclosure relates generally to components of gas turbine engines and, more specifically, to vane lever arms of vane assemblies.

BACKGROUND

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Turbine engines frequently include vane assemblies which guide gas flow into the various sections of the engine. Such assemblies include vanes coupled to vane lever arms. Further, the vanes may be adjustable, which allows for adjustment of the gas flow.

SUMMARY

A vane assembly in accordance with the present disclosure may comprise a vane having a shaft comprising an arm engagement end and a vane lever arm removably coupled to the vane and comprising a body and a first end, wherein the first end comprises a retention slot having an inclined profile. The first end may engage with the arm engagement end of the shaft. The arm engagement end may comprise a profile that is complementary to a shape of the retention slot. The inclined profile of the retention may prevent rotation of the shaft relative to the vane lever arm. The arm engagement end shaft may comprise a threaded portion which passes through an aperture in the first end of the vane and is secured by a nut. The inclined profile may comprise a first wall and a second wall which are parallel to each other, and/or a third wall perpendicular to one of the first wall and the second wall. The vane lever arm may be configured to be removably coupled to a lever pin.

A gas turbine engine in accordance with the present disclosure may comprise a turbine section, a compressor section, and a combustor section, and a vane assembly positioned within at least one of the turbine section, the compressor section, and the combustor section, the vane assembly comprising a vane including a shaft having an arm engagement end, and a vane lever arm removably coupled to the vane and comprising a body and a first end, wherein the first end comprises a retention slot having an inclined profile. The first end may engage with the arm engagement end. The shaft may comprise a profile that is complementary to a shape of the retention slot. The inclined profile of the retention slot may prevent rotation of the shaft. The arm engagement end may comprise a threaded portion which passes through an aperture in the first end of the vane and is secured by a nut. The inclined profile may comprise a first wall and a second wall which are parallel to each other, and/or a third wall perpendicular to one of the first wall and the second wall. The vane lever arm may be configured to be removably coupled to a lever pin.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
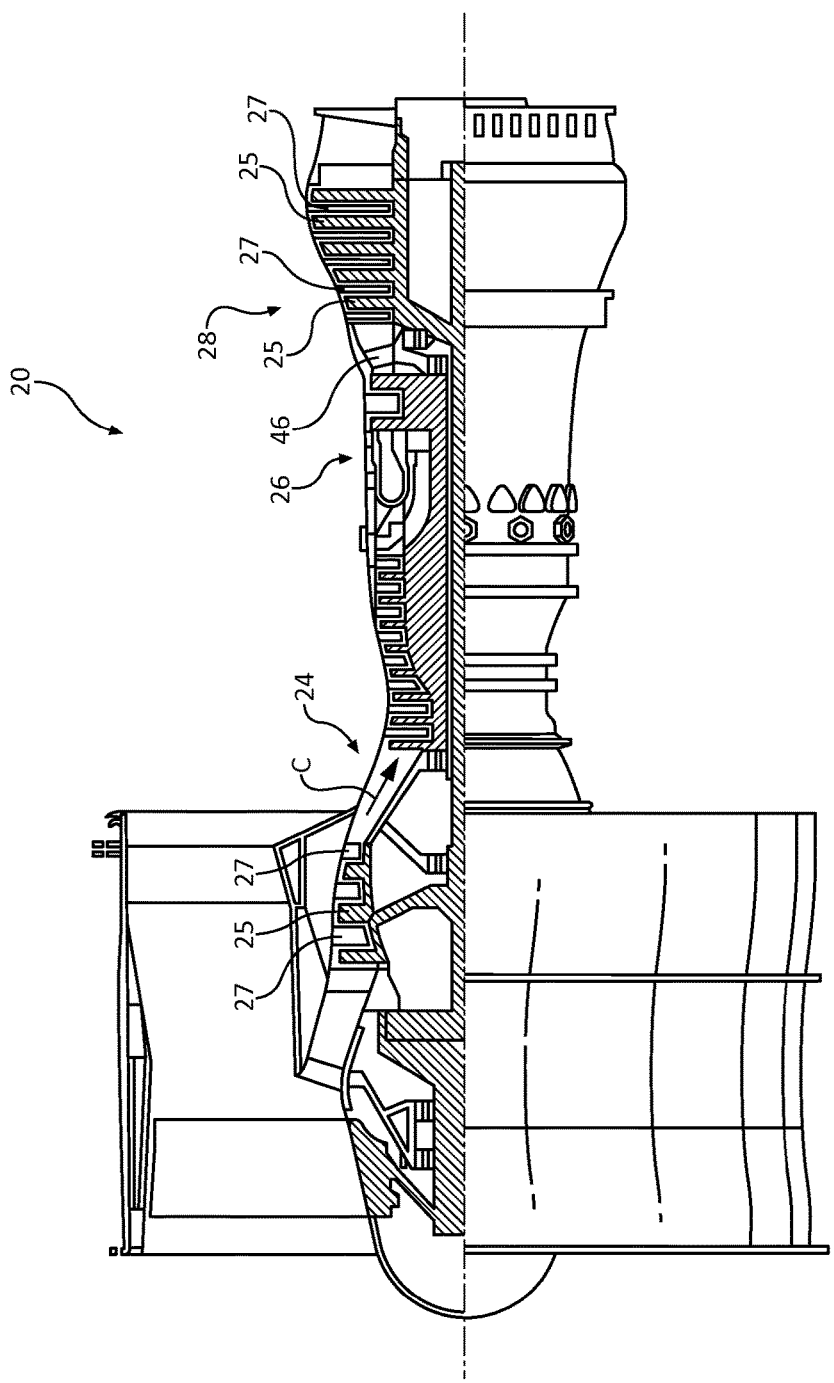
FIG. 1 illustrates, in accordance with the present disclosure, a side view of a gas turbine engine.

Accordingly, with reference to FIG. 1, a gas turbine engine 20 is shown. In general terms, gas turbine engine 20 may comprise a compressor section 24. Air may flow through compressor section 24 and into a combustion section 26, where it is mixed with a fuel source and ignited to produce hot combustion gasses. These hot combustion gasses may drive a series of turbine blades within a turbine section 28, which in turn drive, for example, one or more compressor section blades mechanically coupled thereto.

Each of the compressor section 24 and the turbine section 28 may include alternating rows of rotor assemblies and vane assemblies (shown schematically) that carry airfoils that extend into the core flow path C. In various embodiments, each of these sections comprises a plurality of vane assemblies 46, each having one or more vanes 27. Vanes 27 may, for example, extend into the core flow path C. One or more blades 25 impart energy (in the form of a pressure rise) from the core airflow that is communicated through gas turbine engine 20 along the core flow path C. Vanes 27 direct the core airflow to blades 25 to either add or extract energy.

Figure 2:
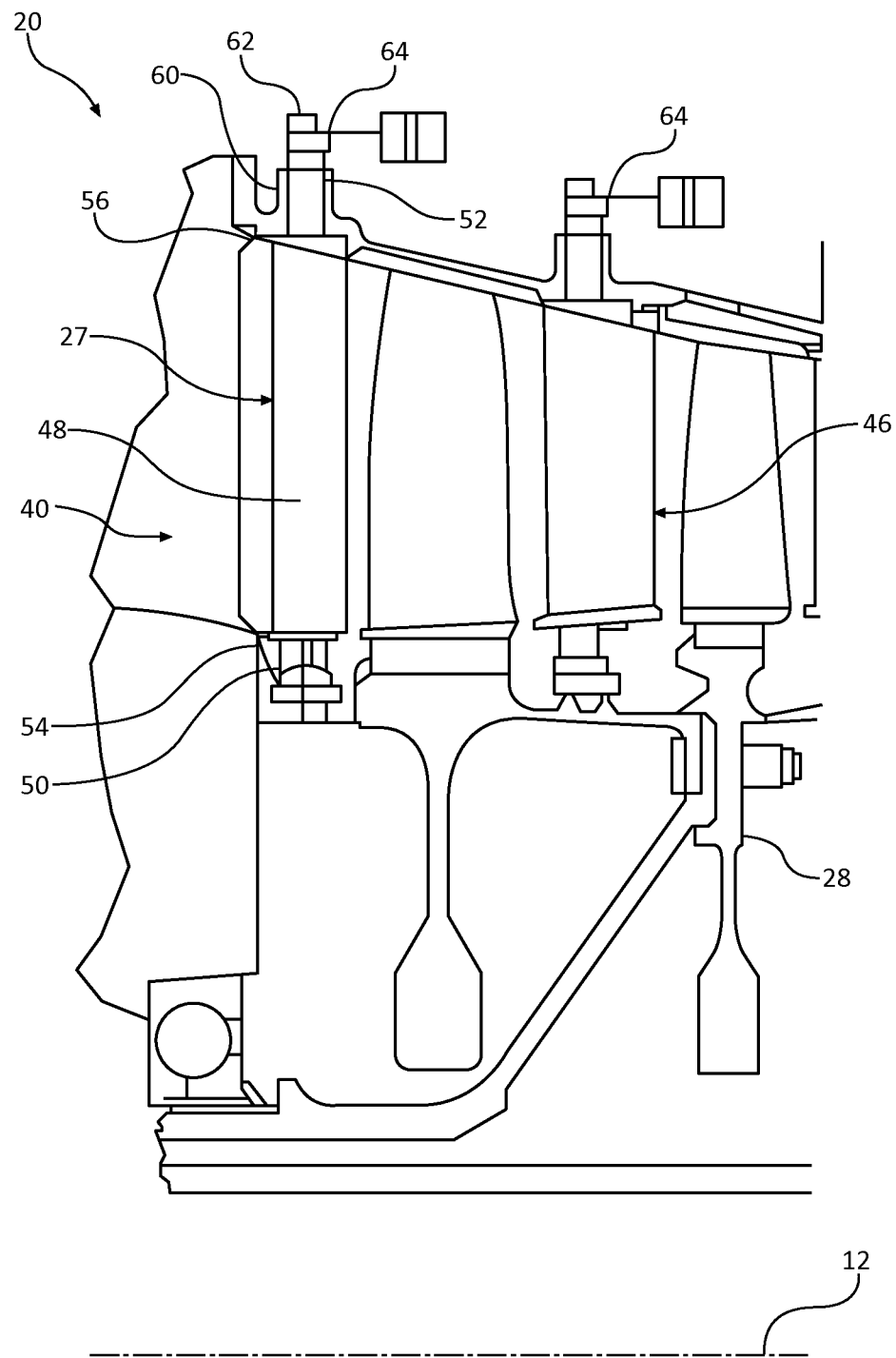
FIG. 2 illustrates, in accordance with the present disclosure, a cross sectional view of a vane assembly.
Figure 3:
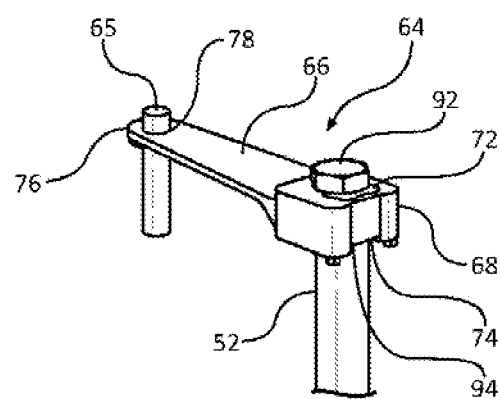
FIG. 3 illustrates, in accordance with the present disclosure, a perspective view of a vane assembly.

With reference to FIGS. 2 and 3, in various embodiments, vane assemblies 46 include one or more vanes 27 that are arranged circumferentially around an axis 12. Each of vanes 27 may comprise an airfoil 48 and one or more vane shafts; e.g., a vane inner shaft 50 and a vane outer shaft 52. In various embodiments, airfoil 48 extends through core gas path 40 between an annular inner vane platform 54 and an annular outer vane platform 56. Airfoil 48 is arranged between the inner and the outer shafts 50 and 52. Inner shaft 50 extends from airfoil 48 into inner vane platform 54, and is rotatably connected to inner vane platform 54. Outer shaft 52 extends from airfoil 48 to vane lever arm 64. Each vane 27 may be rotated by pivoting a vane lever arm 64 with, for example, an actuator.

With reference to FIG. 3, in various embodiments, vane lever arm 64 includes body 66 and a first end 68. First end 68 may include an aperture 72. First end 68 may further include a retention slot 74. In various embodiments, retention slot 74 is configured to receive and orient outer shaft 52. For example, aperture 72 may be located within retention slot 74 of first end 68, thereby allowing outer shaft 52 to pass through retention slot 74 and be secured to vane lever arm 64. In various embodiments, outer shaft 52 comprises a threaded portion that, once passed through aperture 72, may be secured by, for example, a nut.

Figure 4A:
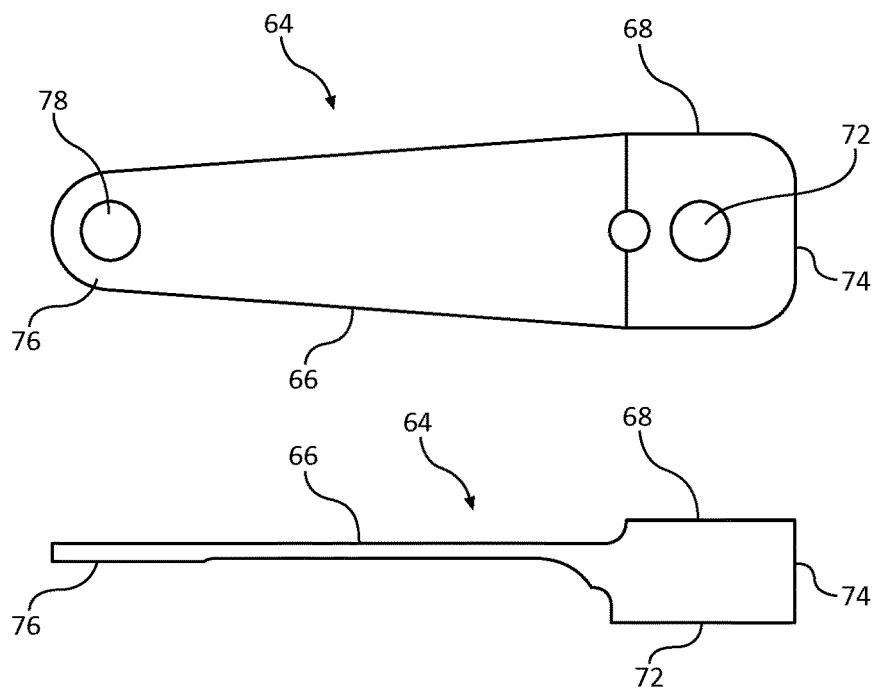
FIGS. 4A and 4B illustrate, in accordance with the present disclosure, various views of a vane lever arm.
Figure 4B:
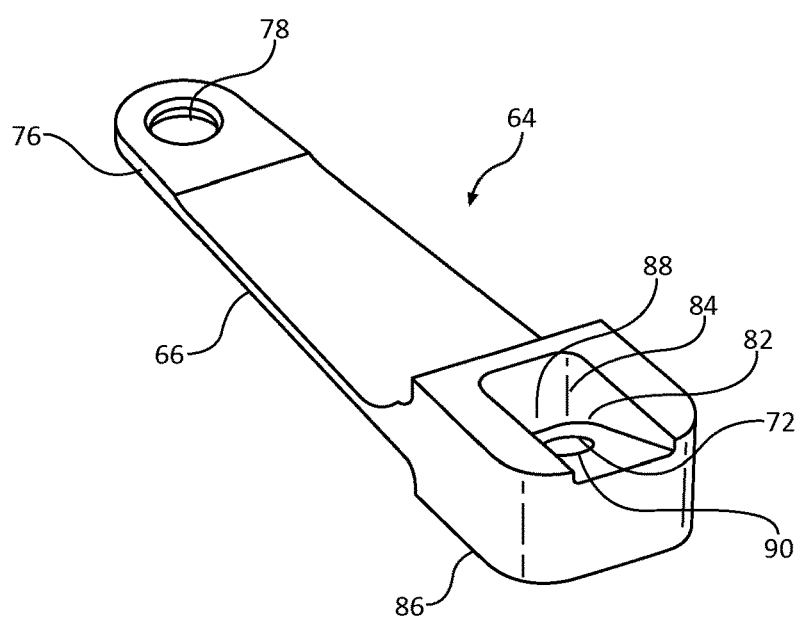

With reference to FIGS. 4A-4B, retention slot 74 may, for example, comprise a cavity larger than aperture 72. For example, retention slot 74 may comprise a first wall 84, a second wall 86, and a third wall 88 which define the shape and configuration of retention slot 74. In various embodiments, first wall 84 and second wall 86 are substantially parallel to each other. In further embodiments, third wall 88 is perpendicular to first wall 84 and/or second wall 86. For example, retention slot 74 may comprise a substantially rectangular shape. However, any configuration of retention slot 74 capable of receiving and orienting outer shaft 52 is within the scope of the present disclosure.

In various embodiments, retention slot 74 comprises an inclined profile 82. For example, retention slot 74 may comprise an inclined face 90. In various embodiments, aperture 72 is located on inclined face 90. Inclined face 90 may be bordered by first wall 84, second wall 86, and/or third wall 88. In various embodiments, inclined profile 82 of retention slot 74 is defined by walls 84, 86, 88 and inclined face 90.

With reference to FIGS. 3 and 4A-4B, outer shaft 52 may comprise, for example, an arm engagement end 92. In various embodiments, arm engagement end 92 comprises a portion configured to fit within and engage with retention slot 74 and inclined profile 82. For example, arm engagement end 92 may comprise a profile that is complementary to inclined profile 82. Stated another way, arm engagement end 92 may comprise the reverse of inclined profile 82. In various embodiments, arm engagement end 92 comprises a portion that is complementary to inclined profile 82.

In various embodiments, outer shaft 52 further comprises a shoulder 94. Shoulder 94 may, for example, make contact with and be at least partially complementary to inclined face 90. For example, outer shaft 52 may be inserted into retention slot 74 such that shoulder 94 contacts inclined face 90, and arm engagement end 92 passes through aperture 72. In various embodiments, the complementary nature of arm engagement end 92 and inclined profile 82 may facilitate engagement between vane lever arm 64 and retention slot 74. Further, inclined profile 82 may reduce and/or eliminate undesired rotation of vane 27 within vane lever arm 64 by securing arm engagement end 92.

With reference to FIGS. 3 and 4A-4B, vane lever arm 64 may comprise a second end 76. In various embodiments, second end 76 comprises an aperture 78 configured to receive and removably couple vane lever arm 64 to a lever pin 65.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vane assembly, comprising;
a vane having a shaft comprising an arm engagement end; and
a vane lever arm configured to be removably coupled to the vane and comprising a body and a first end, wherein the first end comprises a retention slot having an inclined face, wherein the retention slot is defined by the inclined face, a first wall, a second wall, and a third wall, wherein the third wall is coupled with and disposed between at least the first wall or the second wall.

2. The vane assembly of claim 1, wherein the first end engages with the end of the shaft.

3. The vane assembly of claim 2, wherein the arm engagement end comprises a profile that is complementary to a profile of the retention slot.

4. The vane assembly of claim 3, wherein the inclined profile of the retention slot prevents rotation of the arm engagement end relative to the vane lever arm.

5. The vane assembly of claim 1, wherein the aria engagement end comprises a threaded portion which passes through an aperture in the retention slot and wherein the arm engagement end is secured by a nut.

6. The vane assembly of claim 1, wherein the first wall and the second wall are parallel to each other.

7. The vane assembly of claim 6, wherein the third wall is perpendicular to at least one of the first wall or the second wall.

8. The vane assembly of claim 1, wherein the vane lever arm is configured to be removably coupled to a lever pin.

9. A gas turbine engine, comprising:
a turbine section, a compressor section, and a combustor section;
a vane assembly positioned within at least one of the turbine section, the compressor section, or the combustor section, comprising
a vane including a shaft comprising an arm engagement end, and
a vane lever arm configured to be removably coupled to the vane and comprising a body and a first end, wherein the first end comprises a retention slot having an inclined face, wherein the retention slot is defined by the inclined face, a first wall, a second wall, and a third wall, wherein the third wall is coupled with and disposed between at least the first wall or the second wall.

10. The gas turbine engine of claim 9, wherein the first end engages with the shaft of the vane, and wherein the arm engagement end comprises a profile that is complementary to a profile of the retention slot.

11. The gas turbine engine of claim 9, wherein the inclined profile of the retention slot prevents rotation of the arm engagement end relative to the vane lever arm.

12. The gas turbine engine of claim 9, wherein the arm engagement end comprises a threaded portion which passes through an aperture in the retention slot and wherein the arm engagement end is secured by a nut.

13. The gas turbine engine of claim 9, wherein the a first wall and the second wall are parallel to each other.

14. The gas turbine engine of claim 13, wherein the third wall is perpendicular to at least one of the first wall and the second wall.

15. The gas turbine engine of claim 9, wherein the vane lever arm is removably coupled to a lever pin.

* * * * *

UNITED STATES PATENT AND TRADEMARK OFFICE
CERTIFICATE OF CORRECTION

PATENT NO. : 10,018,069 B2
APPLICATION NO. : 14/838906
DATED : July 10, 2018
INVENTOR(S) : Christopher Osborne and Adam Nicholas Hart It is certified that error appears in the above-identified patent and that said Letters Patent is hereby corrected as shown below:

In the Claims

In Column 5, Line 24 please delete "aria" and therefore insert --arm--

In Column 6, Line 27 please delete "the a first" and therefore insert --the first--

Signed and Sealed this
Twenty-eighth Day of August, 2018

Andrei Iancu
*Director of the United States Patent and Trademark Office*